(12) United States Patent
Kim

(10) Patent No.: US 11,518,461 B2
(45) Date of Patent: Dec. 6, 2022

(54) LANDING APPARATUS FOR MOTORCYCLE HAVING VERTICAL ARRANGED SUB-WHEEL

(71) Applicant: Mong Ryong Kim, Seoul (KR)

(72) Inventor: Mong Ryong Kim, Seoul (KR)

( * ) Notice: Subject to any disclaimer, the term of this patent is extended or adjusted under 35 U.S.C. 154(b) by 162 days.

(21) Appl. No.: 17/025,465

(22) Filed: Sep. 18, 2020

(65) Prior Publication Data

US 2021/0163091 A1    Jun. 3, 2021

(30) Foreign Application Priority Data

Nov. 29, 2019   (KR) .......................... 10-2019-0156704

(51) Int. Cl.
*B62H 1/12* (2006.01)
*B62J 45/42* (2020.01)

(52) U.S. Cl.
CPC ................ *B62H 1/12* (2013.01); *B62J 45/42* (2020.02); *B62H 2700/00* (2013.01)

(58) Field of Classification Search
CPC ......... B62H 1/12; B62H 2700/00; B62J 45/42
USPC ....................................................... 280/303
See application file for complete search history.

(56) References Cited

FOREIGN PATENT DOCUMENTS

| CN | 110282052 A | * | 9/2019 | ............... B62H 1/12 |
|---|---|---|---|---|
| CN | 113247147 A | * | 8/2021 | ............... B62H 1/12 |
| JP | 2005199782 A | | 7/2005 | |
| JP | 200627521 A | | 2/2006 | |
| KR | 20130017975 A | * | 2/2013 | ............... B62H 1/12 |
| KR | 10-1311890 | | 9/2013 | |
| KR | 101311890 B1 | | 9/2013 | |
| KR | 20180022204 A | * | 3/2018 | ............... B62H 1/12 |
| KR | 1020180022204 A | | 3/2018 | |
| KR | 101984885 B1 | | 5/2019 | |
| WO | WO-2019135482 A1 | * | 7/2019 | ............... B62H 1/02 |

* cited by examiner

*Primary Examiner* — Kevin Hurley
*Assistant Examiner* — Hosam Shabara
(74) *Attorney, Agent, or Firm* — Maschoff Brennan

(57) ABSTRACT

Disclosed is a landing apparatus for a motorcycle having a vertically arranged sub-wheel, which includes: rotation driving units fixed adjacently to footrests on opposite sides of the motorcycle and including a DC motor, a deceleration module and a motor frame; first main folding links rotatably coupled to opposite sides of the motor frame and rotated by the DC motor; second main folding links rotatably coupled inside the first main folding link; auxiliary folding links rotatably coupled to the motor frame; sub-wheel vertical arranged links having one side rotatably coupled to an inside of a lower end of the second main folding link, and an opposite side rotatably coupled to an inside of the auxiliary folding link, and having an inside coupled to a sub-wheel; and fixing frames for fixing the rotation driving units adjacently to the footrests.

10 Claims, 9 Drawing Sheets

(a)

(b)

(a)

(b)

(a)

(b)

(c)

(a)

(b)

(a)

(b)

(a)

(b)

(a)

(b)

(a)

(b)

(Folded state)

(Unfolded state)

LANDING APPARATUS FOR MOTORCYCLE HAVING VERTICAL ARRANGED SUB-WHEEL

1. FIELD OF THE INVENTION

The present invention relates to a landing apparatus for a motorcycle having a vertically arranged sub-wheel, in which the landing apparatus is folded or unfolded by interworking and rotating joint links sequentially hinged from a rotation driving unit to a sub-wheel so as to allow the sub-wheel always to come into contact with or be separated from the ground in the vertical direction, and Occupies a minimum space upon installation so as to reduce an installation space and minimize an air resistance.

2. DESCRIPTION OF THE RELATED ART

As generally known, the demand for safety apparatuses increases as motorcycles are popularized for hobby and leisure. For example, technologies are being used for preventing a motorcycle from overturning when the motorcycle drives slowly or stops on standby for a traffic signal to reduce fatigue caused by long-distance driving.

As a related art, Korean Patent Registration No. 1311890 is disclosed. The standing wheel device for motorcycles according to the related art includes a body frame, a link frame, an actuator for driving a piston rod to vertically move a wheel, a wheel frame, a damping spring disposed between a first spring shaft and a second spring shaft to absorb an impact applied from the wheel, a tension adjustment bolt, and an expansion spring, so as to distribute and support the load of the motorcycle by the link frame and the actuator.

However, since a cylinder is configured as the actuator and various springs are added, the configuration is complicated, and thus there are difficulties in maintenance and repair and downsizing, thereby causing a significant visual reluctance.

Prior Technical Documents (Patent Document 1) Korean Patent Registration No. 10-1311890 (STANDING WHEEL DEVICE FOR THE MOTORCYCLES)

SUMMARY OF THE INVENTION

The technical problem to be solved by the spirit of the present invention is provide a landing apparatus for a motorcycle having a vertically arranged sub-wheel, in which a folding and unfolding structure for landing is simplified, thereby facilitating maintenance and repair, and minimizing and downsizing an installation space.

In order to achieve the above-mentioned object, the present invention provides a landing apparatus for a motorcycle having a vertically arranged sub-wheel, which includes: rotation driving units which are fixed in adjacent to footrests on opposite sides of the motorcycle and including a DC motor and a deceleration module rotated forward/rearward, and a motor frame for accommodating the deceleration module; first main folding links rotatably coupled to opposite sides of the motor frame while facing each other and rotated at a predetermined angle by the DC motor; second main folding links rotatably coupled to an inside of a lower end of the first main folding link; auxiliary folding links rotatably coupled to a lower end of the motor frame while facing each other; sub-wheel vertical arranged links having one side rotatably coupled to an inside of a lower end of the second main folding link, and an opposite side rotatably coupled to an inside of the auxiliary folding link, and having an inside therebetween to which a sub-wheel coupled to; and fixing frames for fixing the rotation driving units in adjacent to the footrests, wherein the first main folding link, the second main folding link, the auxiliary folding link, and the sub-wheel vertical arranged link are folded or unfolded while interworking each other due to forward/rearward rotations of the DC motor, in which the sub-wheel is aligned vertically with respect to a ground when the sub-wheel comes into contact with or is separated from the ground.

The landing apparatus further may include a damper inserted into a damper insertion hole formed inside the first main folding link overlapping the second main folding link, in which the damper may absorb a shock transmitted from the sub-wheel vertical arranged link due to the contact between the ground and the sub-wheel.

In addition, the damper may be formed of an elastic material and have wrinkles.

In addition, when the sub-wheel is folded, the first main folding link, the second main folding link, the auxiliary folding link, and the sub-wheel vertical arranged link may be folded in close contact with each other.

In addition, the auxiliary folding link may have an L-shape to face the first main folding link, and the sub-wheel vertical arranged link may have a structure to be inserted into the auxiliary folding link when the sub-wheel is folded.

In addition, when the sub-wheel is folded or unfolded the sub-wheel vertical arranged link may maintain a vertical state.

In addition, the deceleration module may include a sun gear and planetary gears having a two-stage structure, and a ring gear, in which an outer side surface of the ring gear may be chamfered to have a triangular shape, and an inner surface of the first main folding link coupled to the outer side surface of the ring gear may face the triangular shape to provide a rotational driving force.

In addition, the sub-wheels may be provided on the opposite sides of the motorcycle, in which the left and right sub-wheels may be unfolded to different heights according to slopes of the ground, respectively.

In addition, the sub-wheel vertical arranged links may be configured such that a pair of vertical arranged links facing each other are bolt-fastened and coupled to each other, in which the sub-wheel may be rotatably coupled to an inside of a lower end of the pair of vertical arranged links.

In addition, the landing apparatus may further include a magnetic sensor unit coupled to one side of the motor frame to detect a rotation of a sensor bolt inserted and fixed to the first main folding link, so that a folding position and an unfolding position of the first main folding link are detected.

According to the present invention, the landing apparatus is folded or unfolded by interworking and rotating joint links sequentially hinged from a rotation driving unit to a sub-wheel so that the sub-wheel can always come into contact with or be separated from the ground in the vertical direction, and occupies a minimum space upon installation so that an installation space can be reduced and an air resistance can be minimized. An impact from the ground is alleviated by using a damper so that the motorcycle can be stably supported. Heights of left and right sub-wheels are individually adjusted so that the motorcycle can be stably supported even on an inclined plane.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
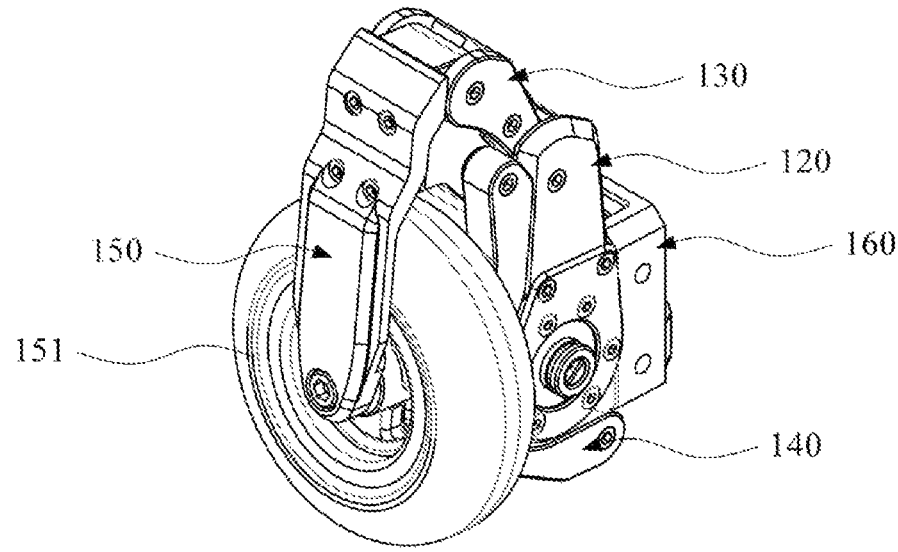
FIG. 1 shows a folded state of a landing apparatus for a motorcycle having a vertically arranged sub-wheel according to an embodiment of the present invention.
Figure 1:
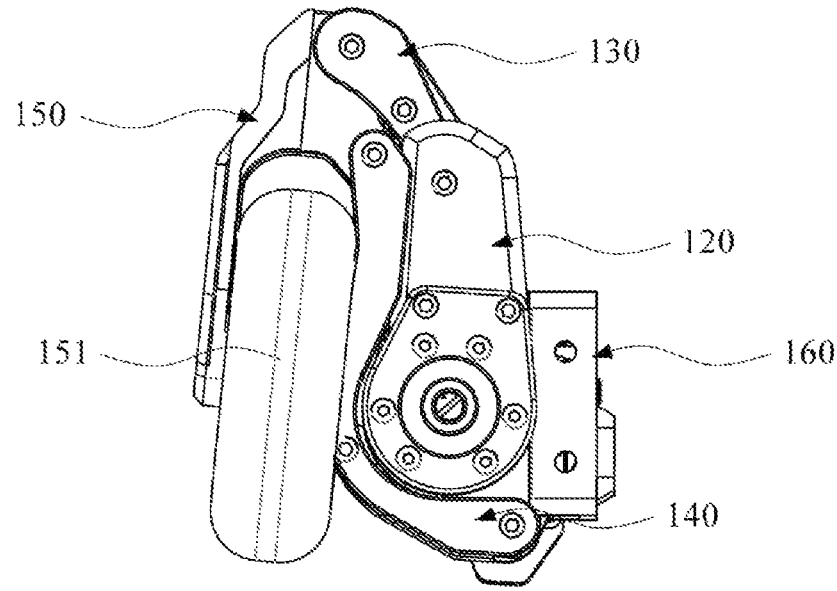

Hereinafter, the embodiments of the present invention having the above-described features will be described in more detail with reference to the accompanying drawings.

Referring to FIGS. 1 to 9, a landing apparatus for a motorcycle having a vertically arranged sub-wheel according to an embodiment of the present invention includes a rotation driving unit 110, a first main folding link 120, a second main folding link 130, an auxiliary folding link 140, a sub-wheel vertical arranged link 150, and a fixing frame 160.

Figure 2:
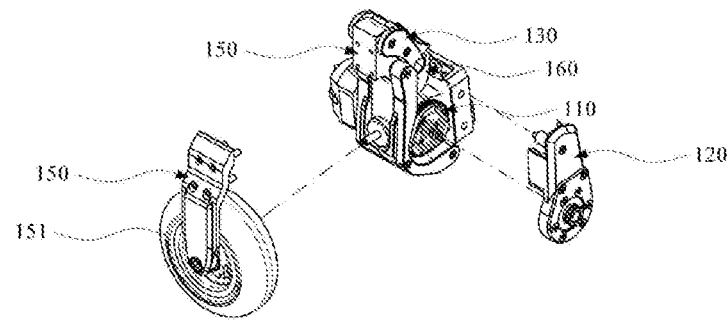
FIGS. 2 and 3 show exploded perspective views of the landing apparatus for a motorcycle having a vertically arranged sub-wheel of FIG. 1
Figure 2:
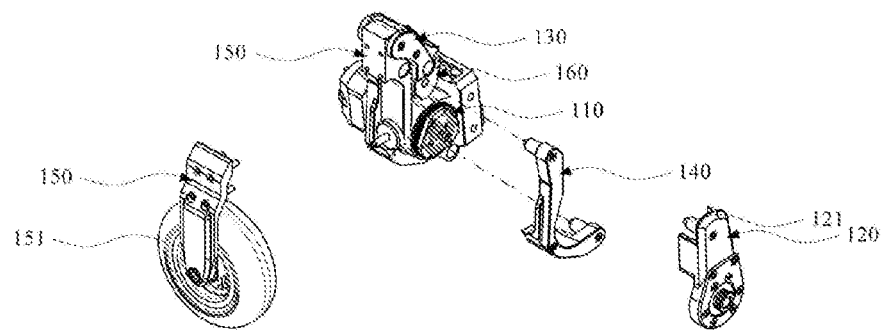
Figure 2:
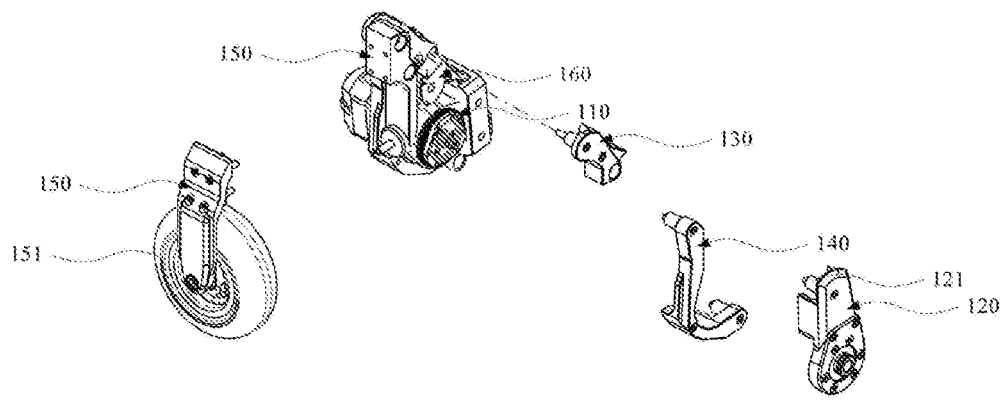
Figure 6:
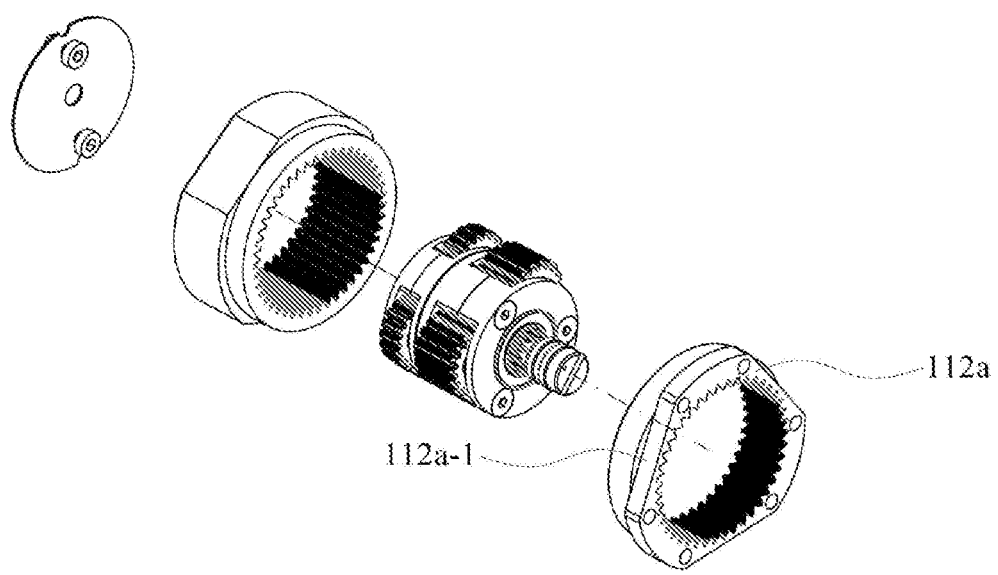
FIG. 6 is an exploded view showing a deceleration module of FIG. 1.

First, as shown in FIGS. 2 and 6, the rotation driving units 110 are adjacently and fixedly provided to footrests on opposite sides of the motorcycle through the fixing frame 160, respectively, and include a DC motor 111 rotated forward/rearward, a deceleration module 112, and a motor frame 113.

For example, the deceleration module 112 is configured to engage with the DC motor 111 and decelerate the rotation to rotate the first main folding link 120, and includes a sun gear and planetary gears having a two-stage structure, and a ring gear 112a, in which the DC motor 111 is rotated at a low speed with a high torque in a forward or rearward direction by sequentially decelerating a high-speed rotation of the DC motor 111 through the high deceleration ratio by the first and second stage planetary gears, thereby smoothly rotating the linked and high-loaded first main folding link 120.

As shown in FIG. 6, an outer side surface 112a-1 of the ring gear 112a may be chamfered to have a triangular shape. As shown FIGS. 3(b) and 5(b), an upper inner surface 120a of the first main folding link 120 coupled to the outer side surface of the ring gear 112a may face the triangular shape to provide a rotational driving force.

Figure 3:
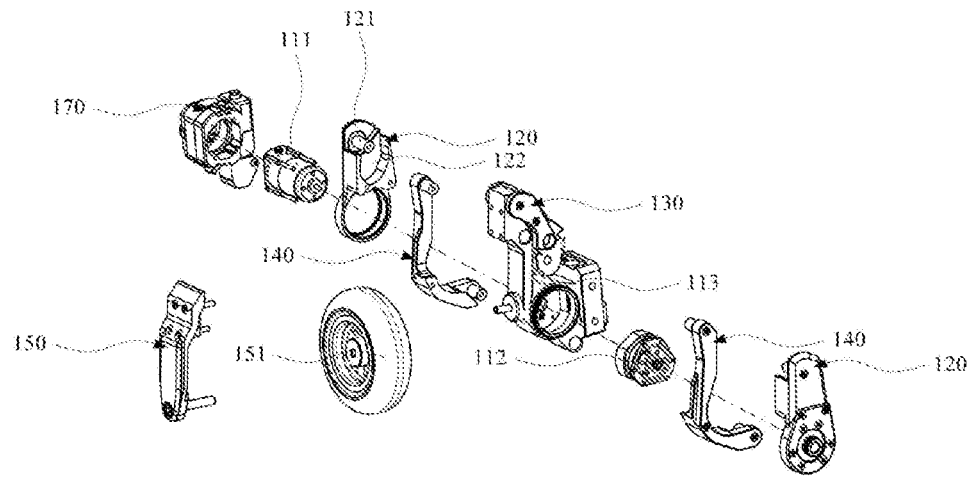
Figure 3:
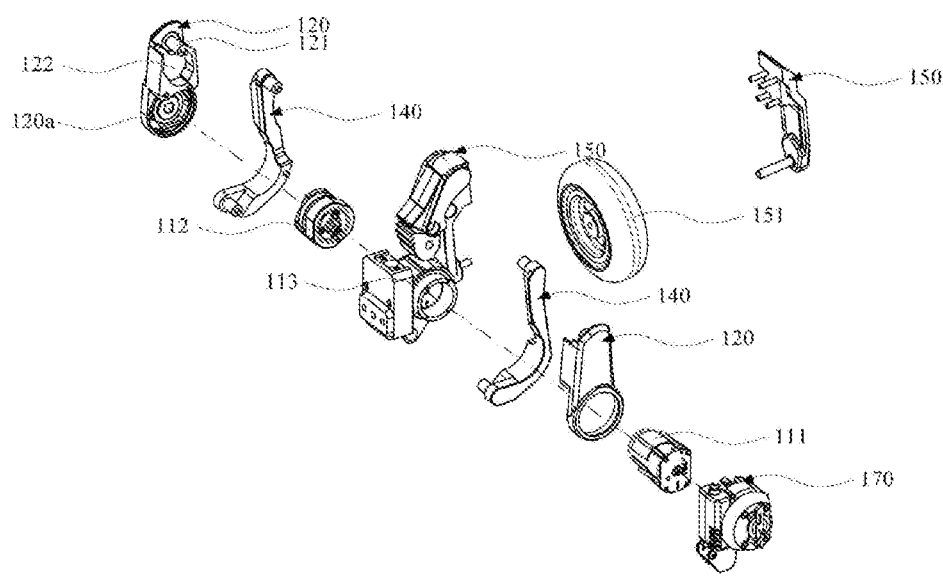
Figure 4:
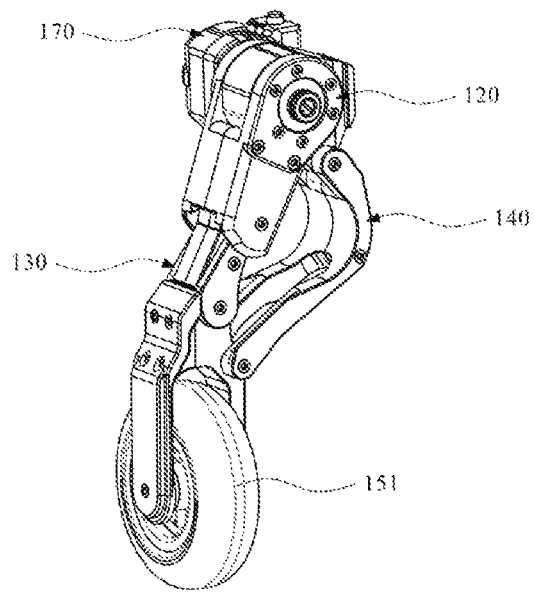
FIG. 4 shows an unfolded state of the landing apparatus for a motorcycle having a vertically arranged sub-wheel FIG. 5 are exploded perspective views showing the unfolded state of FIG. 4.
Figure 4:
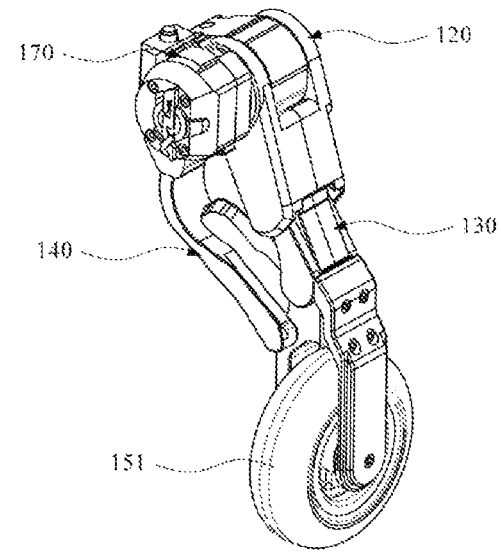
Figure 5:
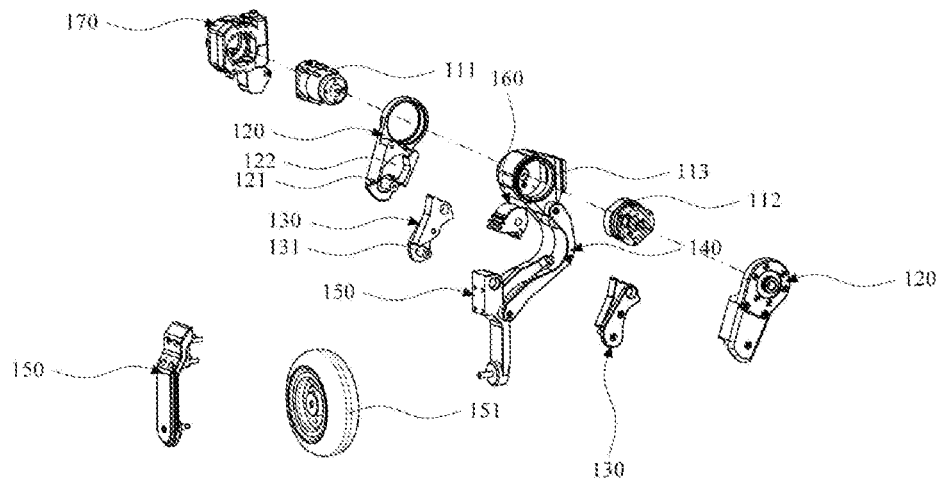
Figure 5:
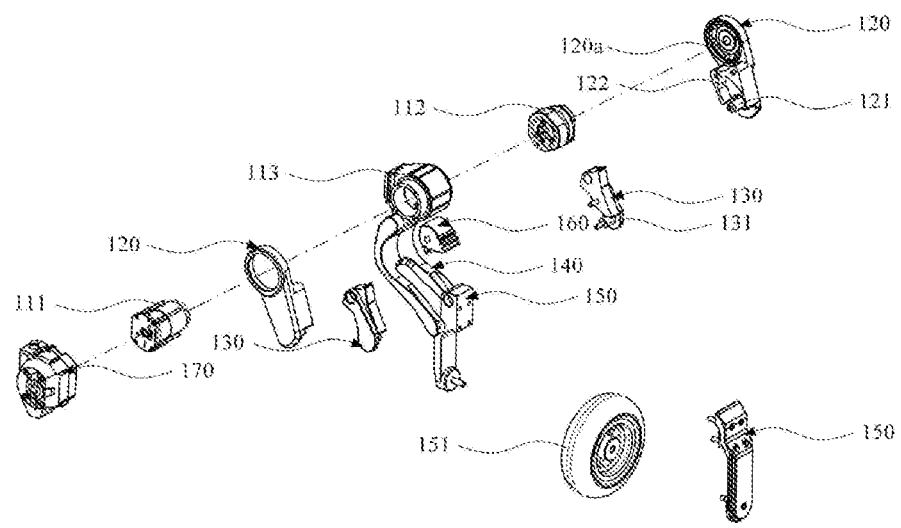

Next, as shown in FIGS. 3 and 5, the first main folding links 120 are rotatably coupled to opposite sides of the motor frame 113 while facing each other, and rotated forward or rearward at a predetermined angle by the DC motor 111.

For example, one side of the first main folding links 120 is rotatably coupled to the deceleration module 112, and the other side is rotatably hinge-coupled to the second main folding link 130.

Next, as shown in FIGS. 3 and 5, the second main folding link 130 may be provided in pairs facing each other, rotatably coupled to an inside of a lower end of the first main folding link 120 so as to be unfolded or folded with respect to the first main folding link 120.

For example, the second main folding link 130 has one side hinge-coupled to the first main folding link 120 through a hinge shaft 121, a center hinge-coupled to the auxiliary folding link 140, and the other side hinge-coupled to the sub-wheel vertical arranged link 150 through a hinge shaft 131.

Next, as shown in FIGS. 3 and 5, the auxiliary folding link 140 is provided in pairs facing each other, in which one side is rotatably coupled to a lower end of the motor frame 113 through a first hinge shaft 141, and the other side is rotatably coupled to the sub-wheel vertical arranged link 150 through a second hinge shaft 142, so as to support the sub-wheel vertical arranged link 150 while guiding a vertical elevation of the sub-wheel vertical arranged link 150 interworking the rotations of the first main folding link 120 and the second main folding link 130.

Next, as shown in FIG. 5, the sub-wheel vertical arranged link 150 is provided in pairs facing each other, in which one side is rotatably coupled to an inside of a lower end of the second main folding link 130, the other side is rotatably coupled to an inside of the auxiliary folding link 140, and a sub-wheel 151 coming into contact with the ground is coupled to an inside of the sub-wheel vertical arranged link.

Next, as shown in FIG. 1, the fixing frame 160 adjacently and stably fixes the rotation driving unit 110 to the footrest.

Figure 7:
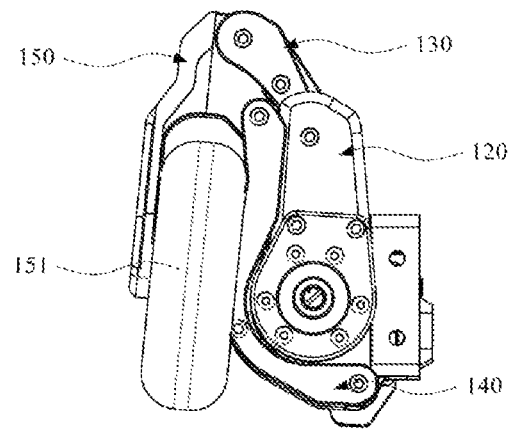
FIG. 7 shows folded and unfolded states the landing apparatus for a motorcycle having a vertically arranged sub-wheel of FIG. 1.
Figure 7:
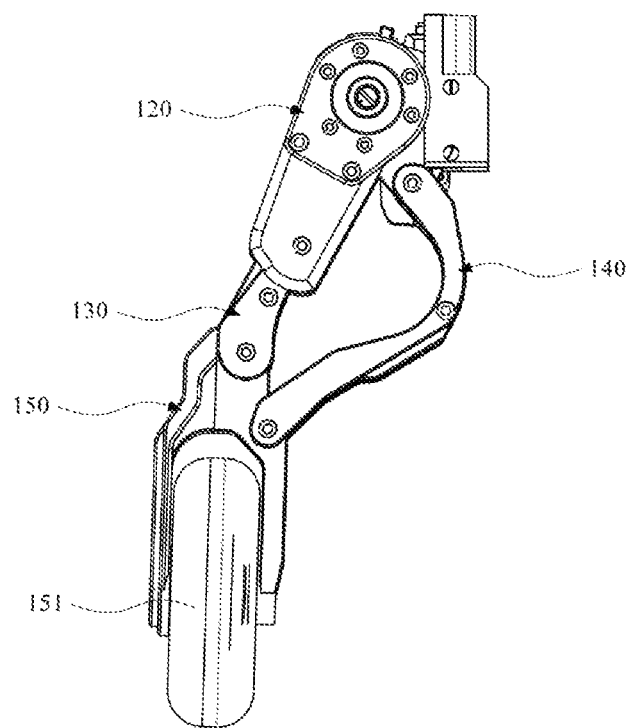
Figure 8:
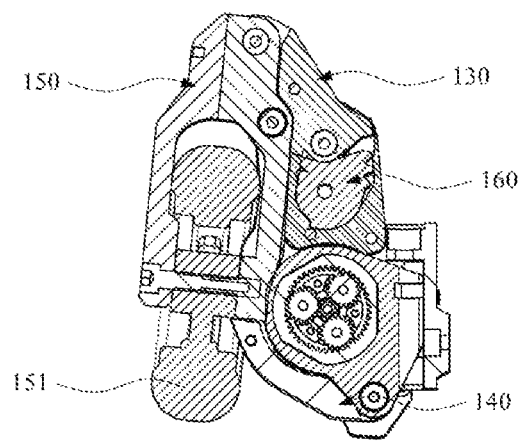
FIG. 8 shows sectional views of the folded and unfolded states of FIG. 7.
Figure 8:
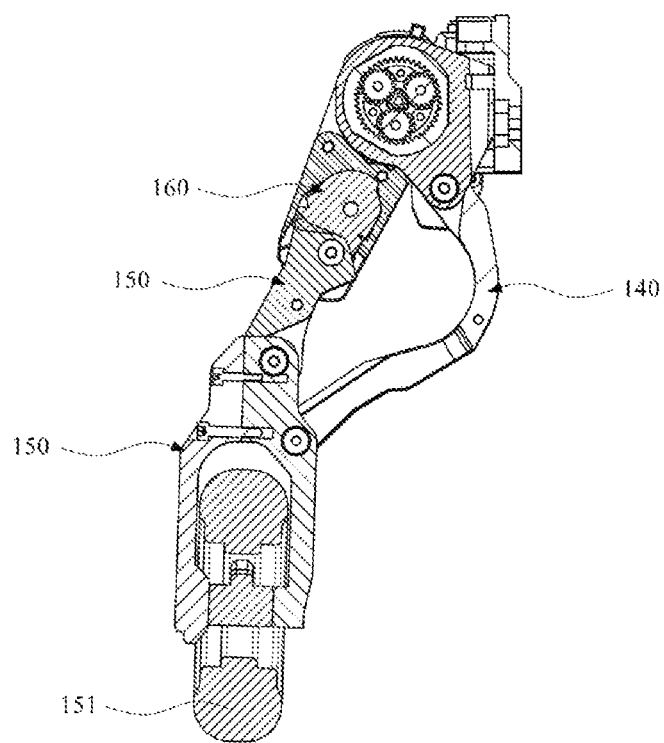
Figure 9:
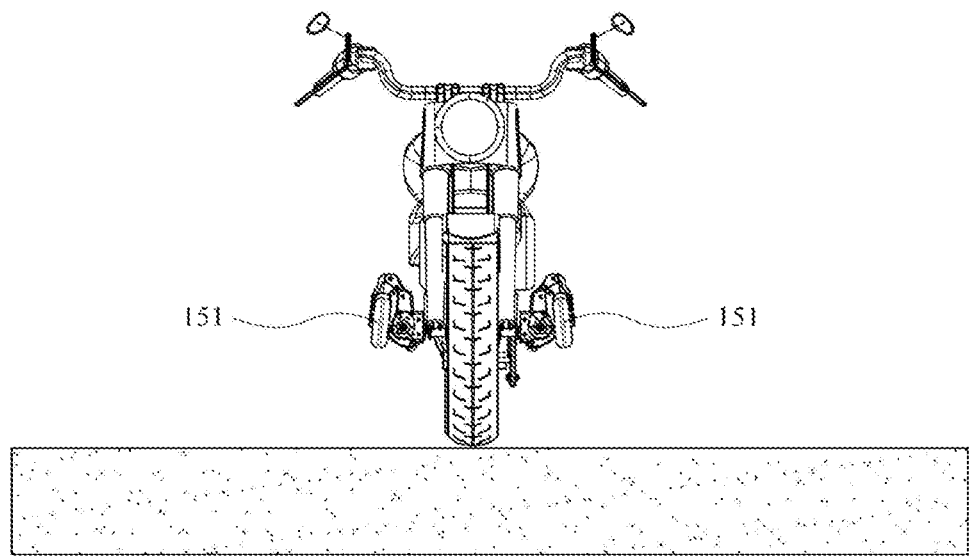
FIG. 9 shows applied examples of the landing apparatus for a motorcycle having a vertically arranged sub-wheel.
Figure 9:
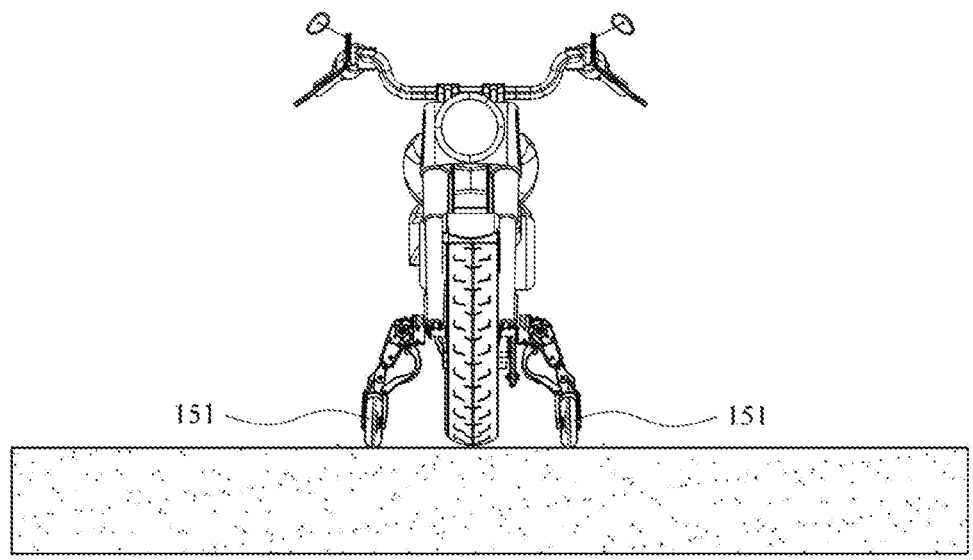

Accordingly, as shown in FIGS. 7 to 9, the first main folding link 120, the second main folding link 130 and the auxiliary folding link 140 are unfolded due to the forward rotation of the DC motor 111, and the sub-wheel vertical arranged link 150 interworks and descends in a diagonal direction, so that the sub-wheel 151 comes into contact with the ground (see FIG. 9(b)). Due to the rearward rotation of the DC motor 111, the first main folding link 120, the second main folding link 130 and the auxiliary folding link 140 are folded, and the sub-wheel vertical arranged link 150 interworks and ascends in the diagonal direction, so that the sub-wheel 151 is separated from the ground (see FIG. 9(a)).

In other words, when the sub-wheel 151 is folded or unfolded, the sub-wheel vertical arranged link 150 maintains a vertical state with respect to the ground, so that the sub-wheel 151 is always aligned vertically with respect to the ground when the sub-wheel 151 comes into contact to or is separated from the ground.

Meanwhile, the sub-wheel 151 coupled to the sub-wheel vertical arranged link 150 is folded or unfolded at an angle of 30° to 45° in the diagonal direction from the rotation driving unit 110, so that the motorcycle can be stably supported when the motorcycle is stopped.

In addition, as shown in FIGS. 2, 5 and 8, the landing apparatus further includes a damper 160 inserted into a damper insertion hole 122 formed inside the first main folding link 120 overlapping the second main folding link 130 upon rotation, in which the damper 160 absorbs the shock transmitted from the sub-wheel vertical arranged link 150 due to the contact between the ground and the sub-wheel 151, thereby absorbing the shock caused by the load of the motorcycle upon the contact between the sub-wheel 151 and the ground, so that the durability of the first main folding link 120, the second main folding link 130, and the sub-wheel vertical arranged link 150 may be increased.

The damper 160 is formed of an elastic material, and has wrinkles as shown in FIG. 5, so as to more smoothly absorb the shock.

In addition, referring to FIGS. 1, 7 and 8, when the sub-wheel 151 is folded, the first main folding link 120, the second main folding link 130, the auxiliary folding link 140, and the sub-wheel vertical arranged link 150 are folded in close contact with each other to occupy a minimal space on the side of the motorcycle, such that the configuration exposed to the outside during driving may be minimized and the air resistance may be minimized.

For example, referring to FIG. 7, the auxiliary folding link 140 is formed in an L-shape to face the first main folding link 120, the sub-wheel vertical arranged link 150 has a structure to be inserted into the auxiliary folding link 140 when the sub-wheel 151 is folded, so that the configuration exposed to the outside may be minimized.

In addition, referring to FIG. 9, when the sub-wheels 151 provided on opposite sides of the motorcycle are folded or unfolded, the sub-wheel vertical arranged link 150 is configured to always maintain a vertical state, and the left and right sub-wheels 151 are configured to be individually height-adjusted, thereby spreading to different heights according to slopes of the ground, respectively, so that the motorcycle can be stably supported even on an inclined plane.

Meanwhile, referring to FIG. 3, the magnetic sensor unit 170 is coupled to one side of the motor frame 113 to detect a rotation of a sensor bolt (not shown) including a neodymiummagnet inserted and fixed to the first main folding link 120, so that a folding position and an unfolding position of the sub-wheel 151 by the rotation of the first main folding link 120 may be accurately detected.

Thus, according to the landing apparatus for the motorcycle having the vertically arranged sub-wheels as described above, the landing apparatus is folded or unfolded by interworking and rotating joint links sequentially hinged from a rotation driving unit to a sub-wheel so as to allow the sub-wheel always to come into contact with or be separated from the ground in the vertical direction, and occupying a minimum space upon installation so as to reduce an installation space and minimize an air resistance. An impact from the ground is alleviated by using a damper so that the motorcycle can be stably supported. Heights of left and right sub-wheels are individually adjusted so that the motorcycle can be stably supported even on an inclined plane.

The embodiments described herein and the configurations shown in the drawings are merely preferred embodiments according to the present invention, and do not represent all of the technical ideas of the present invention. Therefore, it should be understood that various equivalents and modifications may be substituted therefor at the time of filing of the present application.

What is claimed is:

1. A landing apparatus for a motorcycle having a vertically arranged sub-wheel, the landing apparatus comprising:
    rotation driving units which are fixed in adjacent to footrests on opposite sides of the motorcycle and including a DC motor and a deceleration module rotated forward/rearward, and a motor frame for accommodating the deceleration module;
    first main folding links rotatably coupled to opposite sides of the motor frame while facing each other and rotated at a predetermined angle by the DC motor;
    second main folding links rotatably coupled to an inside of a lower end of the first main folding link;
    auxiliary folding links rotatably coupled to a lower end of the motor frame while facing each other;
    sub-wheel vertical arranged links having one side rotatably coupled to an inside of a lower end of the second main folding link, and an opposite side rotatably coupled to an inside of the auxiliary folding link, and having an inside therebetween to which a sub-wheel coupled to; and
    fixing frames for fixing the rotation driving units in adjacent to the footrests, wherein
    the first main folding link, the second main folding link, the auxiliary folding link, and the sub-wheel vertical arranged link are folded or unfolded while interworking each other due to forward/rearward rotations of the DC motor, in which the sub-wheel is aligned vertically with respect to a ground when the sub-wheel comes into contact with or is separated from the ground, the first main folding link, the second main folding link, the auxiliary folding link, and the sub-wheel vertical arranged link are folded while coming into close contact with each other when the sub-wheel is folded, the auxiliary folding link has an L-shape to face the first main folding link, and the sub-wheel vertical arranged link has a structure to be inserted into the auxiliary folding link.

2. The landing apparatus of claim 1, further comprising:
    a damper inserted into a damper insertion hole formed inside the first main folding link overlapping the second main folding link, wherein
    the damper absorbs a shock transmitted from the sub-wheel vertical arranged link due to the contact between the ground and the sub-wheel.

3. The landing apparatus of claim 2, wherein the damper is formed of an elastic material and has wrinkles.

4. The landing apparatus of claim 1, wherein the first main folding link, the second main folding link, the auxiliary folding link, and the sub-wheel vertical arranged link are folded in close contact with each other when the sub-wheel is folded.

5. The landing apparatus of claim 4, wherein the auxiliary folding link has an L-shape that faces the first main folding link, and the sub-wheel vertical arranged link has a structure inserted into the auxiliary folding link when the sub-wheel is folded.

6. The landing apparatus of claim 1, wherein the sub-wheel vertical arranged link maintains a vertical state when the sub-wheel is folded or unfolded.

7. The landing apparatus of claim 1, wherein the deceleration module includes a sun gear and planetary gears having a two-stage structure, and a ring gear, in which an outer side surface of the ring gear is chamfered to have a triangular shape, and an inner surface of the first main folding link coupled to the outer side surface of the ring gear face the triangular shape to provide a rotational driving force.

8. The landing apparatus of claim 1, wherein the sub-wheels are provided on the opposite sides of the motorcycle, in which the left and right sub-wheels are unfolded to different heights according to slopes of the ground, respectively.

9. The landing apparatus of claim 1, wherein the sub-wheel vertical arranged links are formed by coupling a pair of vertical arranged links facing each other using a bolt, in which the sub-wheel is rotatably coupled to an inside of a lower end of the pair of vertical arranged links.

10. The landing apparatus of claim 1, further comprising:
    a magnetic sensor unit coupled to one side of the motor frame to detect a rotation of a sensor bolt inserted and fixed to the first main folding link, so that a folding position and an unfolding position of the first main folding link are detected.

\* \* \* \* \*